United States Patent [19]

Wagner et al.

[11] 4,043,584
[45] Aug. 23, 1977

[54] VEHICLE SUSPENSION AND STABILIZER SYSTEM

[75] Inventors: Robert J. Wagner; Ralph R. Atherton, both of Milwaukee, Wis.

[73] Assignee: Allis-Chalmers Corporation, Milwaukee, Wis.

[21] Appl. No.: 632,856

[22] Filed: Nov. 17, 1975

[51] Int. Cl.² .............................................. B62D 23/00
[52] U.S. Cl. .................................. 296/35 R; 280/713
[58] Field of Search ................... 180/189 A; 280/713, 280/723; 296/28 C, 35 R

[56] References Cited

U.S. PATENT DOCUMENTS

| | | | |
|---|---|---|---|
| 3,420,568 | 1/1969 | Henriksson et al. | 296/35 R |
| 3,944,017 | 3/1976 | Foster | 296/28 C |

*Primary Examiner*—Richard A. Bertsch
*Attorney, Agent, or Firm*—Arthur L. Nelson

[57] ABSTRACT

A vehicle suspension and stabilizer system supporting an operator station on a vehicle chassis through resilient supports and shock absorbers with pitch and roll restraining mechanisms and a stabilizer linkage limiting the operator station movement to essentially a vertical motion.

15 Claims, 10 Drawing Figures

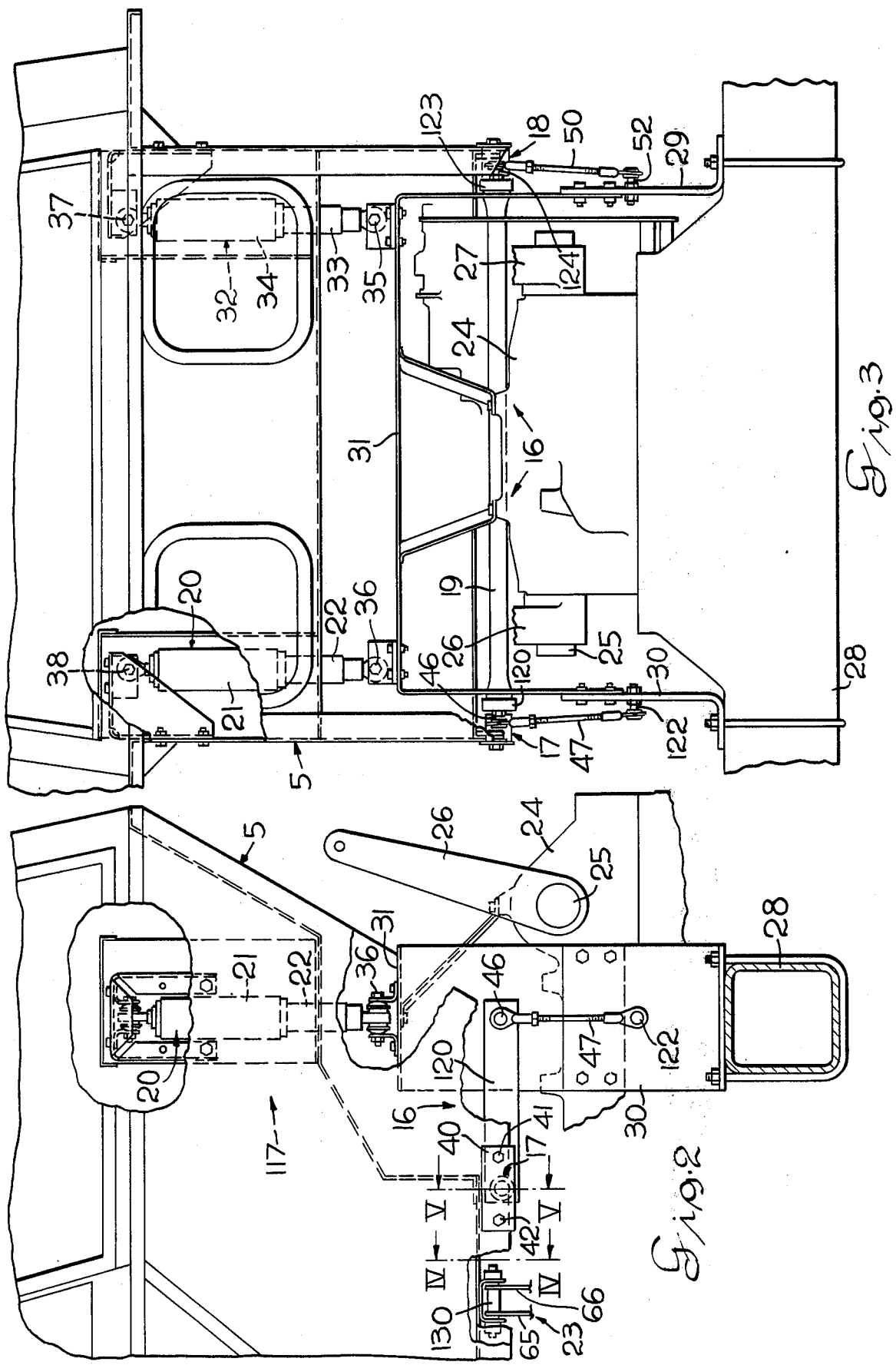

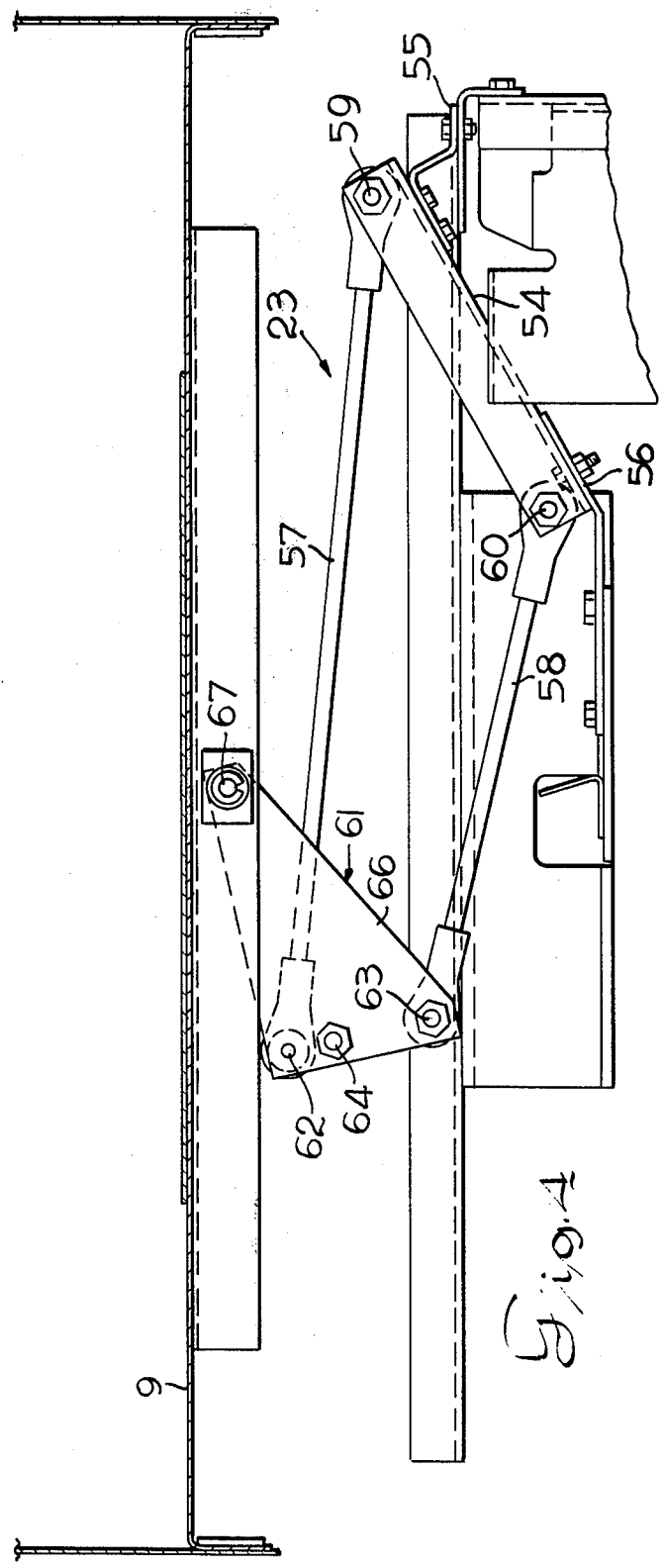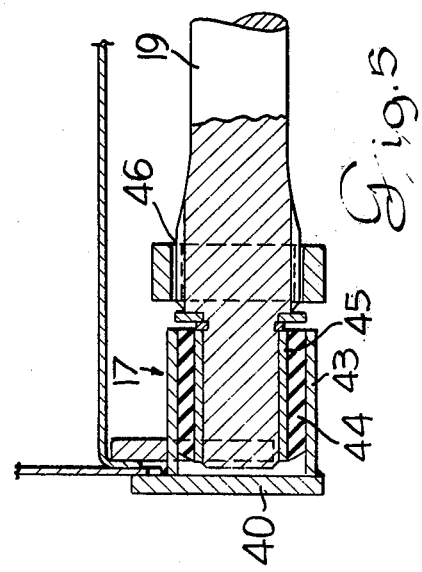

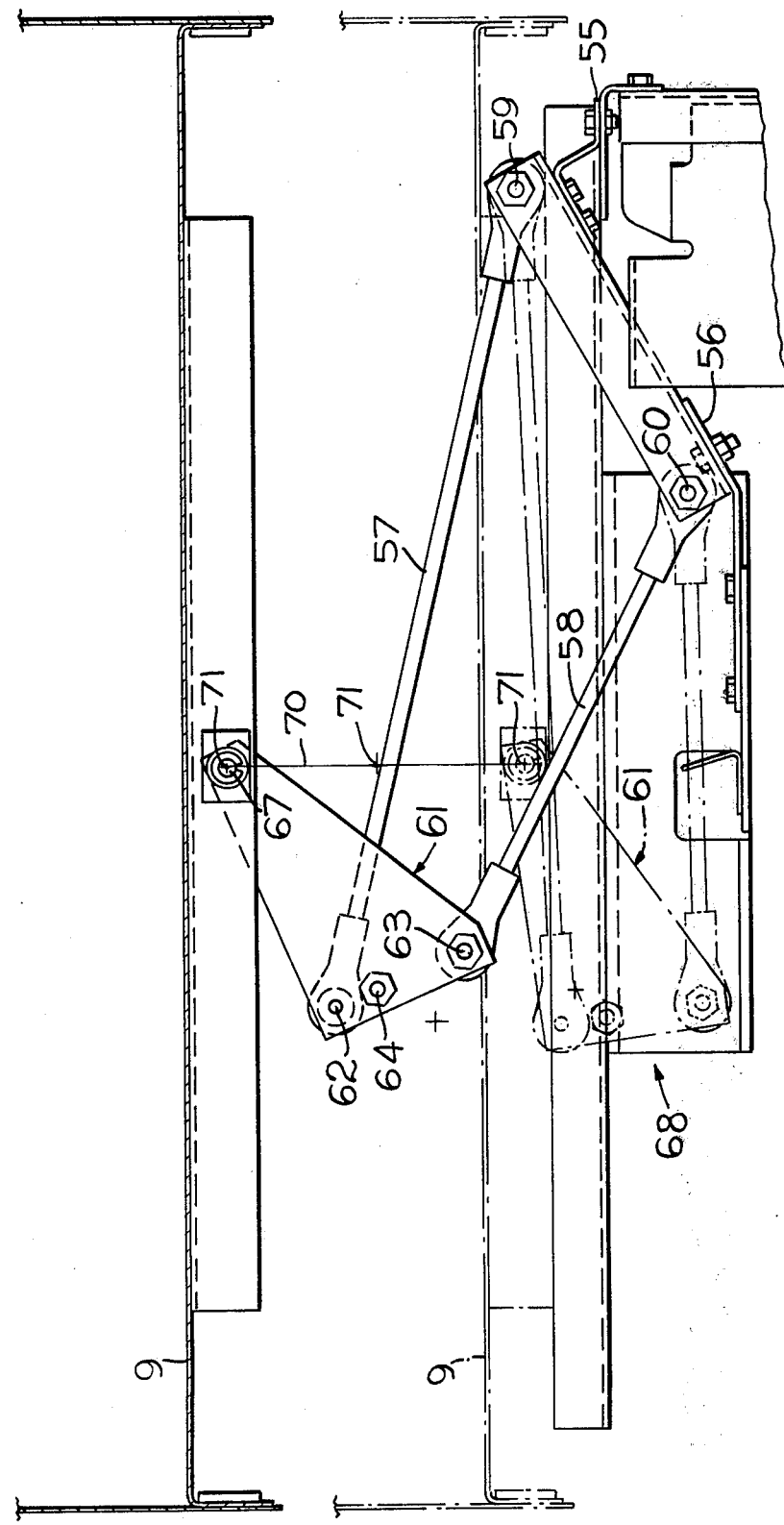

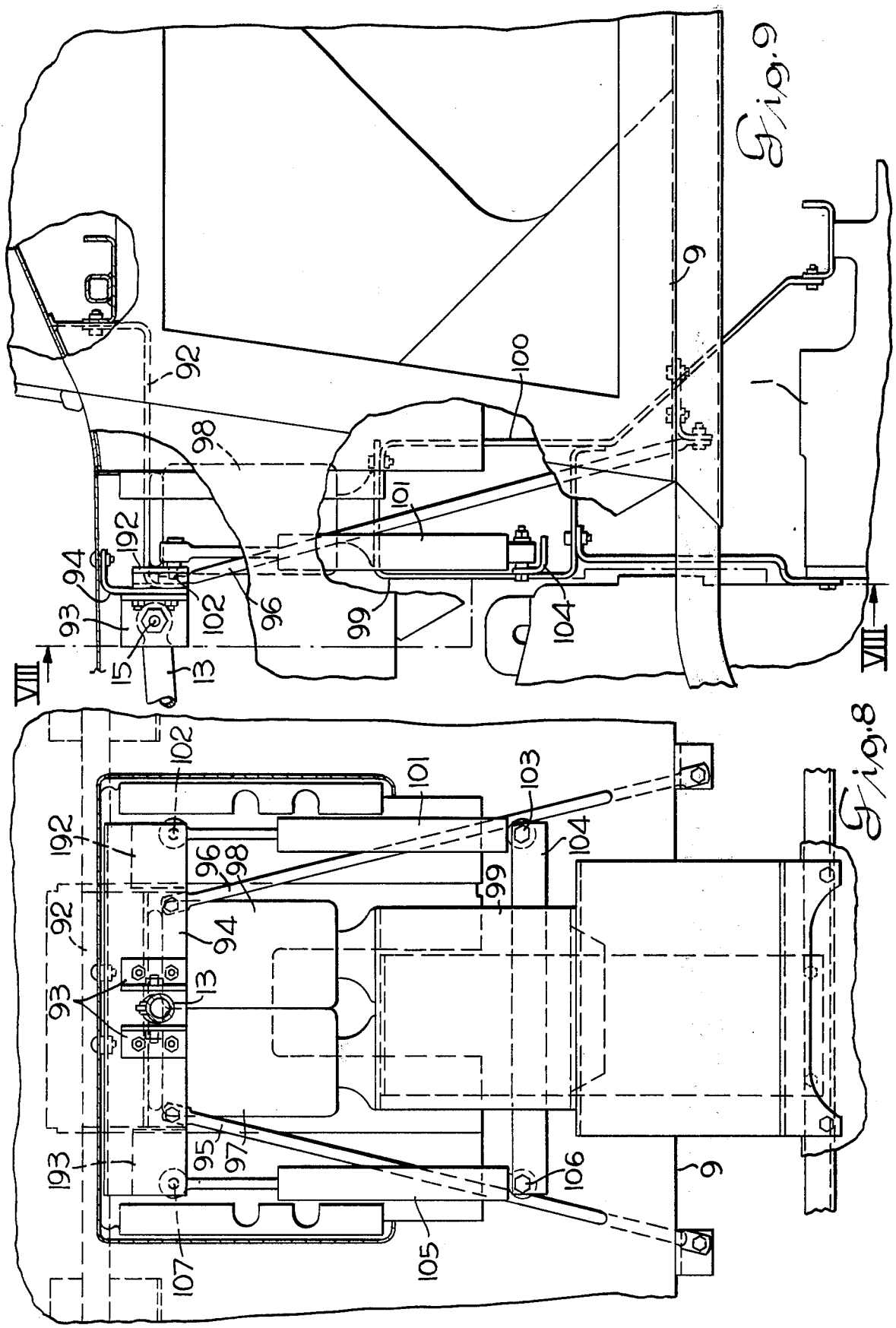

VEHICLE SUSPENSION AND STABILIZER SYSTEM

This invention relates to a vehicle suspension system and more particularly to a vehicle having a chassis mounted unsprung on the wheels and an operator station including a platform resiliently mounted on the chassis and confined to an essentially vertical movement in response to a stabilizer linkage mounted on the chassis and connected to the operator station. Pitch and roll mechanisms are provided to limit the pitch and roll of the operator station as it moves relative to the vehicle chassis.

The conventional tractor includes a chassis mounted unsprung on the vehicle wheels with provisions for mounting the implement and control means for controlling the movement of the implement relative to the vehicle chassis. The vehicle chassis mounted on the wheels follows the contour of the terrain and provides a means for controlling the implement relative to the contour of the terrain. Conventionally, the operator station including the platform are mounted on the chassis or in some instances mounted on rubber isolators to provide at least some cushion to avoid transmission of shock from the chassis to the operator station. Softening the ride for the operator is largely dependent on the seat.

This invention is intended to provide a suspension system in which the operator station is resiliently mounted on the vehicle chassis. Resilient supporting structure mounted on the vehicle chassis resiliently supports the platform and the operator station. A stabilizer linkage is provided on the tractor fore and aft of the operator station to limit the movement of the pivotal connection of the stabilizer linkages to the operator station to essentially a vertical movement which lies in a vertical plane including the longitudinal centers of the vehicle chassis and operator station. Sway limiting mechanism as well as a pitch limiting mechanism are provided to limit the pitch and roll of the operator station as it moves through the vertical plane relative to the vehicle chassis.

It is an object of the present invention to provide a vehicle suspension system for supporting an operator station on the chassis with motion limiting means to limit the relative movement of the operator station relative to the chassis to essentially a vertical movement.

It is another object of this invention to provide a vehicle suspension system by resiliently supporting an operator station on a vehicle chassis with resilient supports and shock absorbers and roll and pitch restraining means and a stabilizer linkage to limit the relative motion between the operator station and the chassis to a vertical movement.

It is another object of this invention to provide a vehicle suspension system with a chassis mounted unsprung on the wheels and resiliently supporting an operator station extending the length of the vehicle with pitch and roll restraining means as well as stabilizer linkages fore and aft of the operator station to limit the motion of the operator station to essentially a vertical movement.

The objects of this invention are accomplished by providing a vehicle chassis mounted unsprung on the vehicle wheels for supporting an implement. Resilient suspension means are mounted on the vehicle chassis resiliently supporting the operator station which includes a platform. Pitch and sway limiting means are also provided to limit the pitch and roll of the operator station relative to the vehicle chassis. Stabilizer linkages are provided with one linkage fore and one aft of the operator station mounted on the vehicle chassis and pivotally connected to the operator station. Each stabilizer linkage is operated in such a manner that the pivot point between the stabilizer linkage fore and aft of the operator station moves in essentially a vertical plane through the longitudinal center of the operator station and the chassis. The suspension system absorbs a roughness encountered by the vehicle chassis and provides a relatively smooth stable ride for the operator.

The preferred embodiments of this invention are illustrated in the attached drawings:

FIG. 2 illustrates a partial cross section view of the rear suspension system including a sway limiting torsion bar;

FIG. 3 is a rear view of the vehicle with partial sections broken away to show the relative positions of the components of the suspension system;

FIG. 4 is a rear view of the rear stabilizer linkage taken on line IV—IV of FIG. 2;

FIG. 4a is a rear view of the rear stabilizer linkage showing the motion of the linkage and the pivotal connection with the operator station;

FIG. 5 is a cross section view taken on line V—V of FIG. 2 showing a section of the end of the torsion bar as it is mounted on the operator station;

FIG. 8 is a cross section view of the mounting of the pitch limiting linkage on the operator station taken on line VIII—VIII of FIG. 9; and FIG. 9 illustrates a side view of the vehicle with sections broken away to show the connection of the pitch limiting linkage.

Figure 1:
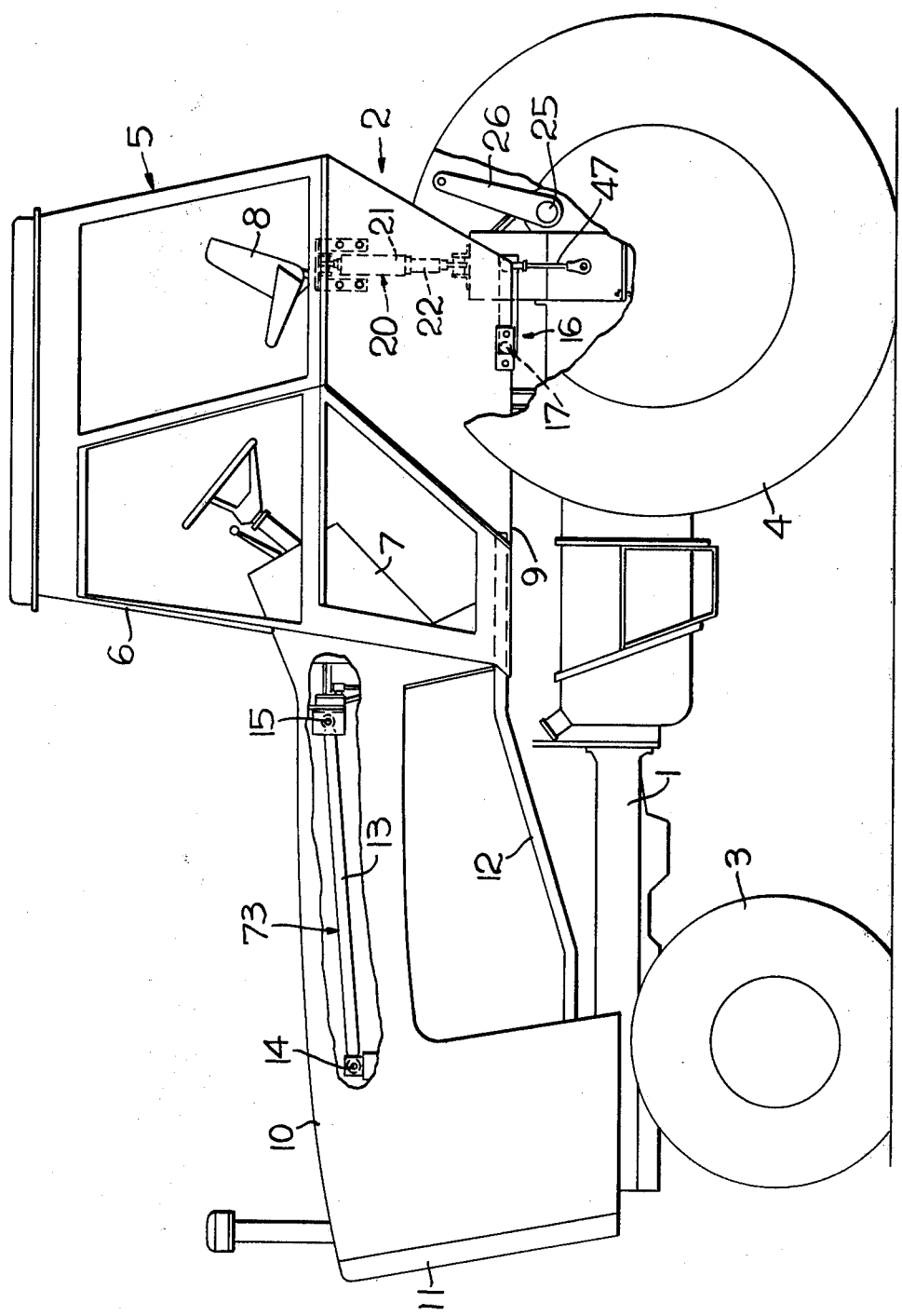
FIG. 1 illustrates a side elevation view of the tractor with fragmentary sections broken away to illustrate the suspension system.

Referring to the drawings, FIG. 1 illustrates a side view of the tractor. The vehicle chassis 1 of the tractor 2 is mounted unsprung on the wheels 3 and 4. The operator station 5 defined by the cab 6, the control console 7, seat 8 and the platform 9 are resiliently mounted on the chassis. The operator station is connected to the engine hood 10 and grill 11 which are supported on the beams 12 which extend forwardly from the platform 9.

A pitch limiting mechanism 73 is connected by the pivotal joint 14 to the vehicle chassis 1 and by the pivotal joint 15 to the operator station 5.

The sway limiting mechanism 16 is pivotally supported by the pivotal support 17 at the left-hand end and pivotal support 18 at the right-hand end to rotatably support the torsion bar 19 on the operator station. The arm 120 is pivotally connected by pin 46 to the link 47 which is pivotally connected to the vehicle chassis 1 by pin 122.

Similarly, arm 123 is pivotally connected to link 50 by pin 124 and link 50 is pivotally connected to chassis 1 by pin 52. The rear end of the operator station 5 is supported by the air shock 20 which includes the air bag 21 and a shock absorber 22 in combination connected between the operator station 5 and chassis 1.

Referring to FIGS. 2 and 3, the sway limiting mechanism 16 and the rear suspension means 117 are illustrated. A portion of the rear stabilizer linkage 23 is also shown connected under the platform. The rear drive housing is shown supporting the rock shaft 25 and the rocker arms 26 and 27. The rear axle housing 28 supports the brackets 29 and 30 which, in turn, support the support bracket 31. The support bracket 31 is connected to the rear drive housing 24 and provides a support for connecting the air shocks 32 and 20. The air shock 32 is shown on the right-hand side of the chassis. Air shock 32 includes a shock absorber portion 33 and an air bag 34 for suspension of the rear portion of the operator station. The air shock 32 is pivotally connected to the support bracket 31 by the pin 35. The air shock 20 is pivotally supported on the support bracket 31 by the pin 36. The air shock 32 is pivotally connected to the operator station by the pin 37. The air shock 20 is pivotally connected to the operator station 5 by the pin 38. The sway limiting mechanism 16 includes a torsion bar 19. The torsion bar 19 is pivotally mounted on the left-hand end in the resilient bushing 17. The resilient bushing 17 is fastened to the operator station by the base plate 40 by means of bolts 41, 42. The mounting of the left-hand end of the torsion bar 19 is shown in FIG. 5. The sleeve 43 receives the rubber bushing 44 supporting bushing 45 enclosing the end of the torsion bar 19. The arm 120 is connected by the spline connection 46 to the torsion bar 19.

FIG. 4 illustrates the rear stabilizing linkage 23. The base 54 is mounted on the brackets 55 and 56 which are mounted on the vehicle chassis. The base 54 is pivotally connected to the arms 57 and 58 by the bolts 59 and 60. Similarly, the links 57, 58 are pivotally connected to the arm 61 by means of bolts 62 and 63. The bolt 64 is provided with a spacer 130 connected between sections 65 and 66 of the arm 61. The arm 61 is pivotally connected to the platform 9 of the operator station by means of a bolt 67.

FIG. 4a illustrates the operation of the stabilizer linkage 23. The solid view is shown in the raised position. The phantom view 68 shows the stabilizer linkage as the operator station 9 is lowered relative to the chassis 1. The line 70 shows the vertical movement of the pivot point 71 between the operator station and arm 61.

Figure 7:
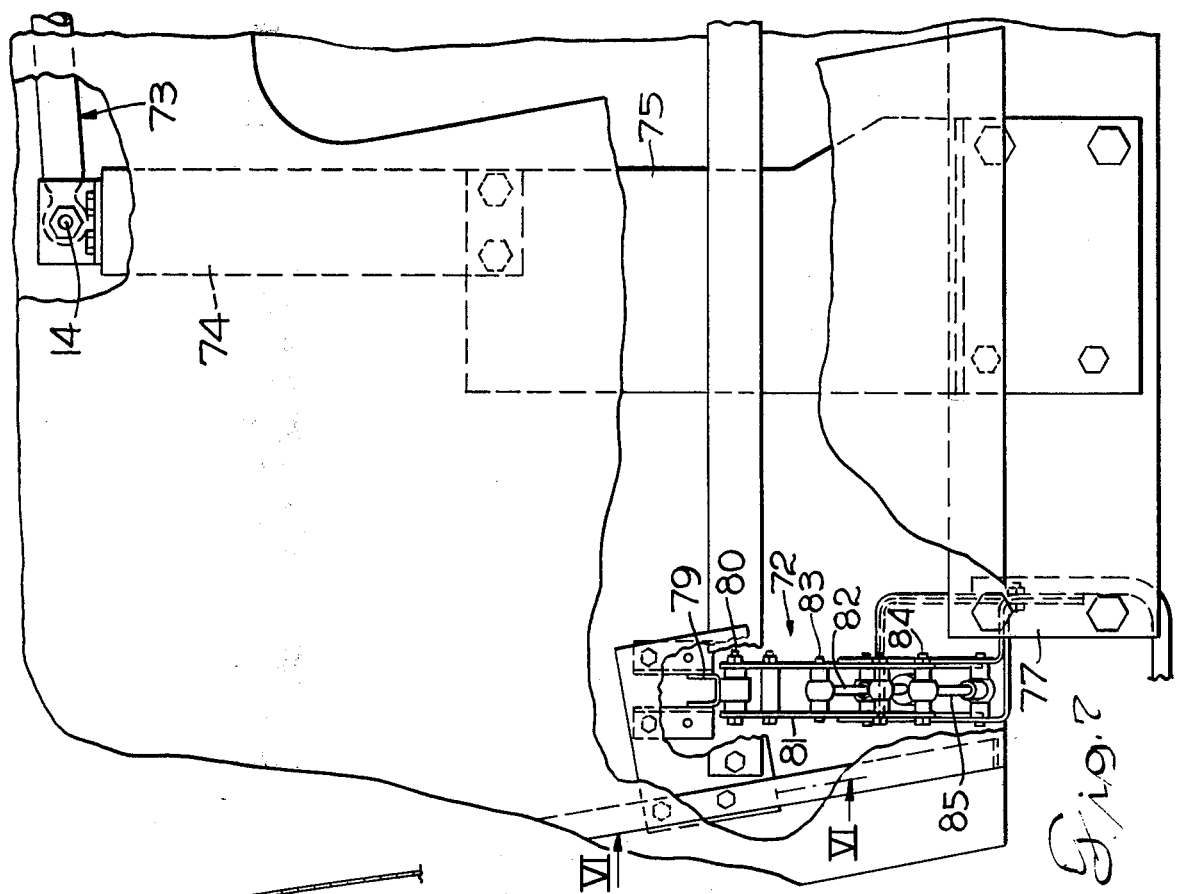
FIG. 7 is a cross section view of the front stabilizer linkage taken at right angles to FIG. 6.
Figure 6:
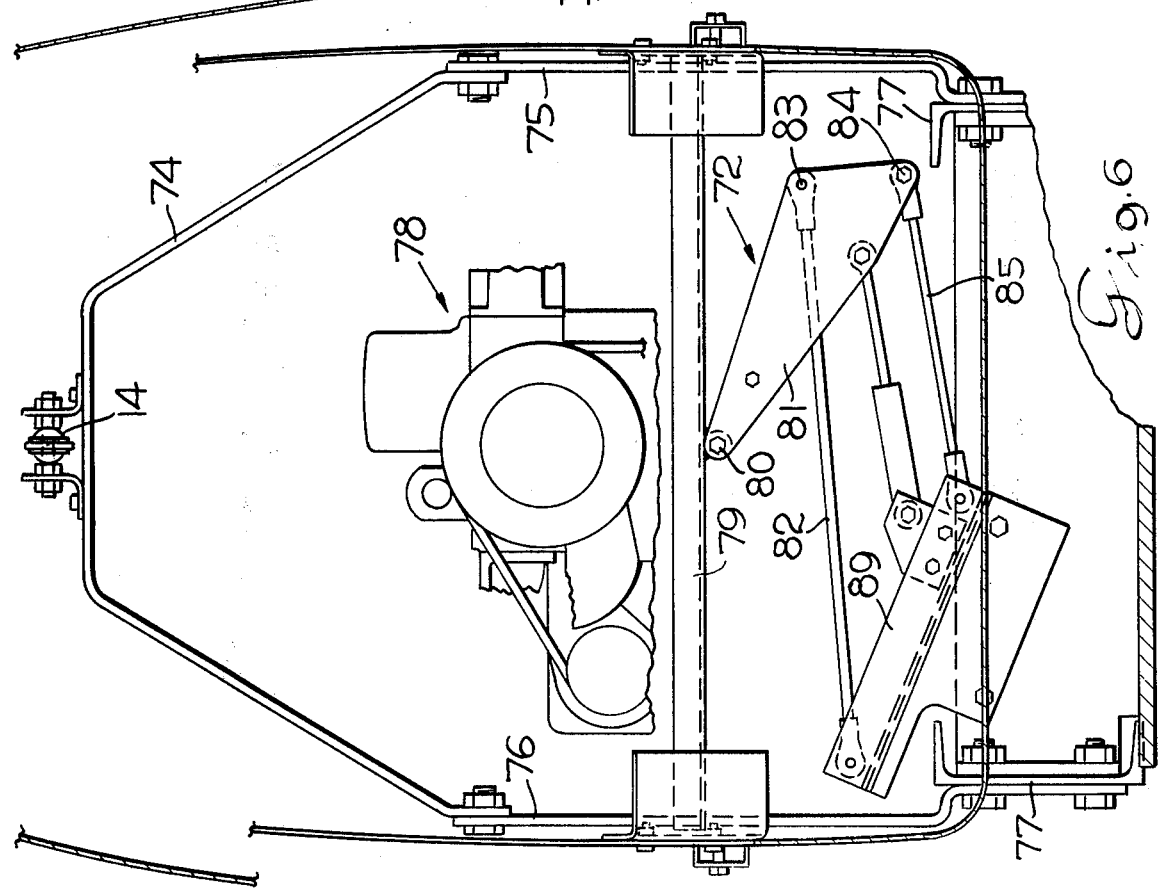
FIG. 6 is a cross section view taken on line VI—VI of FIG. 7 showing the front stabilizer linkage.

FIGS. 6 and 7 illustratethe front stabilizer linkage 72. The joint 14 of the pitch limiting mechanism 73 is also shown. The support bracket 74 is mounted on the uprights 75 and 76 which are mounted on the frame 77 of the vehicle chassis 1.

The engine 78 is mounted on the vehicle chassis immediately behind the stabilizer linkage 72. The cross member 79 is connected to the vehicle chassis and supports a pivot pin 80 pivotally connected to the arm 81. The arm 81 is pivotally connected to the link 82 by pin 83 while the pin 84 connects the link 85 to the arm 81. Links 82 and 85 are pivotally connected to the base support 89 mounted on the vehicle chassis. The operation of the front stabilizer linkage 72 is the same as the rear stabilizer linkage although it is constructed differently because of the shorter space allowed for the linkage in the front of the vehicle.

Shock absorber 195 is pivotally connected by pin 106 to link 81 and by pin 197 to base support 89.

Referring to FIGS. 8 and 9, the rear end of the pitch limiting mechanism is shown. The rod 13 is pivotally connected by the joint 15 to the mounting brackets 93. The mounting brackets 93 are mounted on the base 94 which is connected to the struts 95 and 96. The struts 95 and 96 are connected to the platform 9. The mounting bracket 92 provides connection forthe upper end of the air bags 97 and 98. The lower end of the air bags are mounted on the base plate 99 connected through the brace 100 to the chassis 1. A shock absorber 101 is pivotally connected to the bracket 192 by the pin 102 and pivotally connected by the bolt 103 to the brace 104. The shock absorber 105 is pivotally connected to the brace 104 by the bolt 106 and pivotally connected to the bracket 192 by the pin 107. The air bags 97 and 98 support the forward end of the operator station while the shock absorbers 101 and 105 reduce shock transmitted toward the operator station. The operation of the vehicle suspension and stabilizing system will be described in the following paragraphs.

The vehicle suspension system includes the air bags for resiliently supporting the operator station on the vehicle chassis. Shock absorbers are also used to improve the ride at the operator station. A pitch and roll limiting mechanism is included in the suspension. The pitch limiting system limits the pitch of the operator station relative to the chassis. The roll limiting mechanism includes a torsion bar which is supported on the operator station with arms extending radially from the torsion bar. A link is connected from each arm to the vehicle chassis on each end of the torsion bar. The bar is carried on the operator station and any relative rolling movement of the operator station relative to the chassis is restrained because of the torsion produced in the torsion bar.

The rear stabilizer linkage and the front stabilizer linkage produces essentially a vertical movement of the pivot point between the stabilizers fore and aft of the operator station. The pivot point moves in a plane passing through the longitudinal center of the operator station and the vehicle chassis. The operator station can move vertically through this plane as it is raised and lowered relative to the chassis. The stabilizer linkages do not prevent the operator station from rolling relative to the chassis. The roll limiting mechanism consisting of the torsion bar and associated connections between the operator station and chassis limit the roll of the operator station as it is moved relative to the vehicle chassis.

The air bags have a low spring rate for the load carried and provide a soft ride for the operator. The roughness of the terrain which is transmitted from the wheels toward the vehicle chassis is not transmitted through the suspension system to the operator station. Any relative movement between the operator station and the vehicle chassis is essentially in a vertical plane, however, the pitchand roll of the operator station relative to the chassis is limited due to the pitch and roll limiting mechanism.

The embodiments of the invention in which an exclusive property or privilege is claimed are defined as follows:

1. A tractor having a suspension system comprising, a tractor chassis mounted unsprung on the plurality of wheels, an operator station including means, resilient means mounted on said chassis supporting the operator station, a pitch and roll limiting mechanism connected between said operator station and vehicle chassis for limiting the pitch and the roll of the operator station, a stabilizer linkage means mounted on said vehicle chassis and pivotally connected to said operator station, said stabilizer linkage means including a pair of nonparallel links pivotally connected to said vehicle chassis, an arm pivotally connected to the opposite ends of said links, a pivotal connection pivotally connecting said arm to said operator station defining a pivotal axis, said stabilizer linkage means limiting the relative movement of said pivotal axis to essentially a vertical movement relative to said vehicle chassis as said operator station is moved relative to said vehicle chassis.

2. A tractor having a suspension system as set forth in claim 1 wherein said pitch and roll limiting mechanism includes at least one link pivotally connected to said chassis and pivotally connected to said operator station extending in a longitudinal direction to limit the pitch of said operator station relative to said chassis, a roll limiting mechanism including a torsion bar supported on said operator station, a pair of arms extending from said torsion bar pivotally connected to said vehicle chassis.

3. A tractor having a suspension system as set forth in claim 1 wherein said pitch and roll limiting mechanism includes a bar extending longitudinally from said operator station, means pivotally connecting said bar to said vehicle chassis on its forward end and means pivotally connecting said bar to said operator station on its rearward end.

4. A tractor having a suspension system as set forth in claim 1 wherein said pitch and roll limiting mechanism includes a torsion bar, means pivotally supporting said torsion bar on each end on said operator station, an arm extending radially from each end of said torsion bar, a link pivotally connected to each arm and pivotally connected to the vehicle chassis to thereby provide a roll limiting mechanism.

5. A tractor having a suspension system as set forth in claim 1 wherein said stabilizing linkage means includes a fore stabilizer linkage and a aft stabilizer linkage for limiting the relative movement of the pivotal axis of said stabilizing linkages to a vertical movement.

6. A tractor having a suspension system as set forth in claim 1 wherein said stabilizer linkage means includes a base securely mounted to said vehicle chassis pivotally connected to said links.

7. A tractor having a suspension system as set forth in claim 1 including means uniformly distributing said resilient means under said operator station for moving said operator station in a substantially vertical movement relative to said vehicle chassis with said pivotal connection defining a pivotal axis between said arm and said operator station.

8. A tractor having a suspension system as set forth in claim 1 wherein said vehicle chassis supports four shock absorbers connected between said operator station and said vehicle chassis at the corners of said operator station.

9. A tractor having a suspension system as set forth in claim 1 including two shock absorbing forward of said operator station and two shock absorbers rearwardly of said operator station.

10. A tractor having a suspension system as set forth in claim 1 wherein said stabilizer linkage means includes said two links inclined upwardly to connect to said arm, said arm defining an inclined position inclined upwardly in the opposite direction to pivotally connect to said operator station.

11. A tractor having a suspension system as set forth in claim 1 including, a base defining two openings for pivotal connection to said links whereby one of said openings is at a higher level than the other for pivotally connecting said links, said arm defining a triangular member having pivotal connection with said links in each of two corners and a pivotal connection with said operator station in the third corner.

12. A tractor having a suspension system as set forth in claim 1 including a base pivotally supporting said two links on the side of said vehicle chassis, said links extending transversely beyond the longitudinal center of said chassis for pivotally connecting said arm, said arm extending transversely to the center of said operator station for pivotally connecting to said operator station.

13. A tractor having a suspension system as set forth in claim 1 wherein said resilient means supporting said operator station defines air bags for supporting the weight of said operator station.

14. A tractor having a suspension system as set forth in claim 1 wherein said resilient means supporting said operator station defines resilient supports having a low spring rate.

15. A tractor having a suspension system comprising, a tractor chassis mounted unsprung on the plurality of wheels, an operator station including platform means, resilient means mounted on said chassis supporting the operator station, a pitch and roll limiting mechanism connected between said operator station and vehicle chassis for limiting the pitch and the roll of the operator station, a stabilizer linkage means mounted on said vehicle chassis and pivotally connected to said operator station, said stabilizer linkage means including, a base mounted on said vehicle chassis, a pair of links of unequal length pivotally connected to said base mounted on said vehicle chassis, an arm pivotally connected to the opposite ends of said links, a pivotal connection pivotally connecting said arm to said operator station defining a pivotal axis, said stabilizer linkage means limiting the relative movement of said pivotal axis to essentially a vertical movement relative to said vehicle chassis as said operator station is moved relative to said vehicle chassis.

* * * * *

UNITED STATES PATENT OFFICE
CERTIFICATE OF CORRECTION

Patent No. 4,043,584      Dated August 23, 1977

Inventor(s) Robert J. Wagner and Ralph R. Atherton

It is certified that error appears in the above-identified patent and that said Letters Patent are hereby corrected as shown below:

Column 4, line 58 - "platform" was omitted before the word "means"

Signed and Sealed this

Twenty-eighth Day of February 1978

[SEAL]

Attest:

RUTH C. MASON
*Attesting Officer*

LUTRELLE F. PARKER
*Acting Commissioner of Patents and Trademarks*